(12) United States Patent
Brebner et al.

(10) Patent No.: US 11,182,580 B2
(45) Date of Patent: Nov. 23, 2021

(54) FINGERTIP IDENTIFICATION FOR GESTURE CONTROL

(71) Applicant: UMAJIN LIMITED, Palmerston North (NZ)

(72) Inventors: David Brebner, Palmerston North (NZ); Richard Rountree, Palmerston North (NZ)

(73) Assignee: UMA JIN LIMITED, Palmerston North (NZ)

( * ) Notice: Subject to any disclaimer, the term of this patent is extended or adjusted under 35 U.S.C. 154(b) by 382 days.

(21) Appl. No.: 15/762,590

(22) PCT Filed: Sep. 26, 2016

(86) PCT No.: PCT/GB2016/052984
§ 371 (c)(1),
(2) Date: Mar. 23, 2018

(87) PCT Pub. No.: WO2017/051199
PCT Pub. Date: Mar. 30, 2017

(65) Prior Publication Data
US 2018/0260601 A1    Sep. 13, 2018

(30) Foreign Application Priority Data
Sep. 25, 2015   (GB) ...................................... 1516953

(51) Int. Cl.
*G06K 9/00* (2006.01)
*G06F 3/01* (2006.01)
(Continued)

(52) U.S. Cl.
CPC .......... *G06K 9/00006* (2013.01); *G06F 3/011* (2013.01); *G06F 3/017* (2013.01);
(Continued)

(58) Field of Classification Search
CPC ................. G06K 9/00006; G06T 1/20; G06T 2207/10028; G06T 2207/20132;
(Continued)

(56) References Cited

U.S. PATENT DOCUMENTS 6,704,456 B1 *  3/2004  Venable ................... G06K 9/32
                                                            382/266
2007/0223817 A1 *  9/2007  Ulrich .................. G06K 9/6255
                                                            382/199

(Continued)

FOREIGN PATENT DOCUMENTS

JP         2008021121 A      1/2008

OTHER PUBLICATIONS

M.K. Bhuyan, Debanga Raj Neog and Mithun Kumar Kar;"Fingertip Detection for Hand Pose Recognition"; International Journal on Computer Science and Engineering (IJCSE); Mar. 2012.*

(Continued)

*Primary Examiner* — Shaghayegh Azima
(74) *Attorney, Agent, or Firm* — Saul Ewing Arnstein & Lehr LLP

(57) ABSTRACT

A computer implemented method of fingertip centroid identification in real-time, implemented on a computer system comprising a processor, memory, and a camera system. The processor receives image data from the camera system; runs a first kernel comprising a set of concentric closed shapes over image data to identify an occupancy pattern in which internal closed shapes are at least nearly fully occupied, and in which a subsequent closed shape has at least a relatively low occupancy level, so as to identify one or more fingertips in the image data; for each identified fingertip, runs a second kernel over the identified one or more fingertips to establish a best fit closed shape which covers each identified fingertip; calculates a centroid for each best fit closed shape which (Continued)

corresponds to an identified fingertip; and stores in the memory the calculated centroids for the identified one or more fingertips.

24 Claims, 12 Drawing Sheets

(51) Int. Cl.
| | | |
|---|---|---|
| *G06T 7/136* | (2017.01) | |
| *G06T 7/13* | (2017.01) | |
| *G06T 7/155* | (2017.01) | |
| *H04N 13/204* | (2018.01) | |
| *G06T 1/20* | (2006.01) | |
| *H04N 5/33* | (2006.01) | |

(52) U.S. Cl.
CPC ............... *G06T 1/20* (2013.01); *G06T 7/13* (2017.01); *G06T 7/136* (2017.01); *G06T 7/155* (2017.01); *H04N 5/33* (2013.01); *H04N 13/204* (2018.05); *G06T 2207/10028* (2013.01); *G06T 2207/20132* (2013.01)

(58) Field of Classification Search
CPC . G06T 7/13; G06T 7/136; G06T 7/155; G06F 3/017; G06F 3/011; H04N 13/204; H04N 5/33
See application file for complete search history.

(56) References Cited

U.S. PATENT DOCUMENTS

| | | | | |
|---|---|---|---|---|
| 2009/0219379 | A1* | 9/2009 | Rossato | G06T 7/194 348/14.01 |
| 2010/0214292 | A1* | 8/2010 | Dohta | G06T 15/405 345/422 |
| 2010/0329509 | A1* | 12/2010 | Fahn | G06K 9/00389 382/103 |
| 2013/0257720 | A1* | 10/2013 | Noda | G06K 9/6269 345/157 |
| 2014/0104168 | A1* | 4/2014 | Hegde | G06F 3/005 345/157 |
| 2014/0104194 | A1* | 4/2014 | Davidson | G06F 3/0447 345/173 |
| 2014/0168378 | A1* | 6/2014 | Hall | G06F 3/0425 348/47 |
| 2014/0195983 | A1* | 7/2014 | Du | G06K 9/00201 715/849 |
| 2014/0198049 | A1* | 7/2014 | Xue | G06F 1/169 345/168 |
| 2014/0324197 | A1* | 10/2014 | Mizuno | G08C 17/00 700/83 |
| 2015/0063722 | A1* | 3/2015 | Connell, II | G06T 17/10 382/285 |
| 2015/0199816 | A1* | 7/2015 | Freeman | G06T 19/006 345/633 |
| 2015/0253864 | A1* | 9/2015 | Parkhomenko | G06F 3/017 345/156 |

OTHER PUBLICATIONS

Yan Wen, Chuanyan Hu, Guanghui Yu, Changbo Wang; "A Robust Method of Detecting Hand Gestures Using Depth Sensors"; IEEE; 2012.*

Yun Liao, Yuxiang Zhou, Hua Zhou, and Zhihong Liang; "Fingertips Detection Algorithm Based on Skin Colour Filtering and Distance Transformation"; IEEE; 2012.*

M.K. Bhuyan, Debanga Raj Neog and Mithun Kumar Kar; "Fingertip Detection for Hand Pose Recognition"; International Journal on Computer Science and Engineering (IJCSE); Sep. 2015.*

International Search Report, dated Jan. 25, 2017, issued in International Application No. PCT/GB2016/052984.

Combined Search and Examination Report, dated Mar. 20, 2017, issued in corresponding GB Application No. GB1616287.7.

* cited by examiner

FINGERTIP IDENTIFICATION FOR GESTURE CONTROL

CROSS REFERENCE TO RELATED APPLICATIONS

This application claims the priority of PCT/GB2016/052984, filed on Sep. 26, 2016, which claims priority to GB Application No. GB1516953.5, filed on Sep. 25, 2015, the entire contents of which being fully incorporated herein by reference.

BACKGROUND OF THE INVENTION

1. Field of the Invention

The field of the invention relates to methods of fingertip identification, and to related systems and computer program products.

2. Technical Background

One problem with several conventional 3D or depth sensing camera systems is that they find it difficult to accurately detect and track the movements of fingertips, making it difficult to mimic accurately 2D touch screen or touch pad interactions, such as tapping, dragging, selecting, scrolling, zooming etc.

3. Discussion of Related Art

Inverse kinematics refers to the use of the kinematics equations of e.g. an animated character to determine the joint parameters that provide a desired configuration of the animated character. Specification of the movement of the animated character so that its configuration achieves a desired motion as a function of time is known as motion planning. Inverse kinematics transforms the motion plan into joint actuation trajectories for the animated character.

Existing skeletal tracking solutions have problems where the final inverse kinematic phase, which attempts to rectify the skeleton, will almost always reposition joints including the final position of the fingertips—as a result the fingertips are almost always pushed off centre and often outside of the hand silhouette. This causes a lot of inaccuracy and jitter between frames for the fingertip tracking. An example is shown in FIG. 1, in which the four detected fingertips are located off-centre of the end regions of the fingers.

Hands which are only partially in view are a very common occurrence e.g. when the hand is close to the camera and filling a lot of the view. This seriously undermines the stability of the skeletal approach, making it very difficult to use for interaction. Users do not get clear feedback why the hand tracking is failing as they are still clearly holding their hand up in front of the camera frustum—they do not understand that there is only a partial match in the hand tracking process. Accessibility to the bottom of the screen is very unreliable with the skeletal approach, because, when approaching the bottom of the screen, approximately the bottom half of the hand or hands may not be in view. FIG. 2 shows an example of a poor result in attempted finger tracking, in which two hands are only partially in view when approaching the bottom of the screen. FIG. 3 shows an example of a poor result in attempted finger tracking, in which one hand is only partially in view.

Similarly, using 'hand centre' tracking approaches is also unsatisfactory as the external shape of the hand can change a lot, and finding a stable centre of the blob for a 'cursor' is challenging—even selecting from 4 or 5 items horizontally is difficult to do with e.g. a 640×480 depth buffer. Examples of unsatisfactory hand centre tracking are shown in FIGS. 2 to 5, in which the large white circles identify the tracked hand centres. In particular closing the fingers of the hand into a fist has a number of problems for skeletal systems where the centre of the hand moves, and finger bones are left in an ambiguous position. Children's hands, endomorphic (soft, round body build) versus ectomorphic (lean, delicate body build) hand types and long sleeves all provide specific challenges for skeletal trackers, often resulting in quite noisy results.

FIG. 4 shows an example of a poor result in attempted finger tracking, in which the fingers of the hand have been closed into a fist. FIG. 5 shows an example of a poor result in attempted finger tracking, in which the fingers of the hand have been closed into a fist.

There is a need for an improved approach to finger tracking, which works well in the context of simulated finger-to-item (eg. finger-to-screen) interactions.

SUMMARY OF THE INVENTION

According to a first aspect of the invention, there is provided a computer implemented method of fingertip centroid identification in real-time, implemented on a computer system comprising a processor, memory, and a camera system, the method including the steps of:

(i) the processor receiving image data from the camera system;

(ii) the processor running a first kernel comprising a set of concentric closed shapes over image data to identify an occupancy pattern in which internal closed shapes are at least nearly fully occupied, and in which a subsequent closed shape has at least a relatively low occupancy level, so as to identify one or more fingertips in the image data;

(iii) for each identified fingertip, the processor running a second kernel over the identified one or more fingertips to establish a best fit closed shape which covers each identified fingertip;

(iv) the processor calculating a centroid for each best fit closed shape which corresponds to an identified fingertip, and (v) the processor storing in the memory the calculated centroids for the identified one or more fingertips.

The term "concentric" denotes circles, arcs, or other shapes which share the same centre. Examples of closed shapes are circles, ellipses, ovals, triangles, squares and polygons.

An advantage is that fingertips can be detected and tracked accurately. An advantage is that fingertips can be detected and tracked accurately, even when a substantial part of the hand is not visible to the camera system. An advantage is that the use of kernels allows use in parallel with other processes, and may be optimised to take advantage of a graphics processing unit (GPU) or custom image processing hardware, such as in the form of a field-programmable gate array (FPGA) or an application-specific integrated circuit (ASIC).

The method may be one in which sub pixel accuracy, and per frame accuracy with no lag, are provided.

The method may be one in which the camera system is a 3D or depth sensing image camera system. An advantage is that it becomes easier to identify the hand or hand parts based on their distance from the camera system.

The method may be one in which the 3D or depth sensing image camera system is an infra red-based depth sensor system or a stereoscopic camera system.

The method may be one in which the infra red-based depth sensor system is an Intel Real Sense or a Microsoft Kinect.

The method may be one wherein depth data is thresholded so that hands are the only likely objects in the view. An advantage is that by identifying the hand or hand parts based on their distance from the camera system, the identified hand or hand parts require less image processing than processing a full image with no depth-based filtering.

The method may be one wherein the processor runs a modified morphological operator to erode edges based on depth and/or curvature. An advantage is that a simpler shape is produced for subsequent analysis.

The method may be one wherein the processor runs a modified morphological operator to infill holes and average the z values. An advantage is that a simpler, smoother shape is produced for subsequent analysis. Different filters may be used depending on the type of camera used. Time of flight infrared cameras may use a median filter for example.

The method may be one wherein the processor performs an identifying fill on spatially proximate pixels in the image data, so as to identify possible hands or hand parts in the image data.

The method may be one wherein the processor identifies fingers and determines respective angles in two dimensional space of the identified fingers. An advantage is that input from the pointing direction of fingers is therefore readily obtained.

The method may be one wherein a z sample from a finger boundary is used to determine the z gradient of the fingertip, to determine if the finger is facing into, flat or out of the view. An advantage is that input from the tilting direction of fingers is therefore readily obtained.

The method may be one in which the camera system provides a stream of image data.

The method may be one wherein the processor calculates a stream of centroids from the stream of image data, the processor tracking the identified one or more fingertips by analyzing a stream of calculated centroids for the identified one or more fingertips.

The method may be one wherein temporal tracking with a simple motion predictor is used to identify fingertips between frames.

The method may be one wherein the processor uses the tracked identified one or more fingertips to identify a gesture by the one or more fingertips.

The method may be one wherein the gesture is a tap, wiggle, swipe, hover, point, shake, tilt finger or dwell.

The method may be one wherein the dwell gesture performs a lock/select of a user interface item, and subsequent finger movement performs a drag of the user interface item.

The method may be one wherein a shake gesture releases the user interface item.

The method may be one wherein a tilt finger gesture performs a drag or paint.

The method may be one wherein the hover gesture snaps a cursor to the nearest UI element as if there is a gravity effect.

The method may be one wherein a plurality of fingers pointing up from an open hand is a rotate gesture.

The method may be one wherein the processor analyses stored fingertip tracking data and identifies an execution of a recognized fingertip gesture by a fingertip.

The method may be one wherein the computer system further comprises a display.

The method may be one wherein on the display, an overlay is provided of depth data which has been thresholded on the users view.

The method may be one wherein the intensity with which a hand is rendered on the display falls off visually as a hand gets too far away from the intended position.

The method may be one wherein a cursor is presented on the display for each of the identified fingertips.

The method may be one wherein a fingertip cursor has an icon and/or colour indication of its state.

The method may be one wherein the processor displays user interface elements on the display.

The method may be one wherein the processor identifies fingertip gestures for interaction with the user interface elements.

The method may be one wherein the processor detects selection of a displayed user interface element, when a tracked fingertip position satisfies a predefined spatial relationship with respect to a displayed user interface element.

The method may be one in which fingers tilted forward (i.e. tilt detected), or currently being moved toward the screen in the z axis (i.e. tapping motion detected), are used in a piano playing application.

The method may be one in which the display is a HUD display, in which for stereo views the flattened hand visualisation converges at about the exact same depth as the head up display (HUD) displayed interface elements.

The method may be one in which the processor is a graphics processing unit (GPU).

According to a second aspect of the invention, there is provided a computer program product for fingertip centroid identification in real-time, the computer program product executable on a processor of a computer system comprising the processor, memory, and a camera system, to:
(i) receive image data from the camera system;
(ii) execute a first kernel comprising a set of concentric closed shapes over image data to identify an occupancy pattern in which internal closed shapes are at least nearly fully occupied, and in which a subsequent closed shape has at least a relatively low occupancy level, so as to identify one or more fingertips in the image data;
(iii) for each identified fingertip, execute a second kernel over the identified one or more fingertips to establish a best fit closed shape which covers each identified fingertip;
(iv) calculate a centroid for each best fit closed shape which corresponds to an identified fingertip, and
(v) store in the memory the calculated centroids for the identified one or more fingertips.

The computer program product may be executable to perform a method of any aspect of the first aspect of the invention.

According to a third aspect of the invention, there is provided a graphics processing unit or specialised hardware (e.g. an FPGA or an ASIC), arranged to perform a method of any aspect of the first aspect of the invention in hardware, not in software.

According to a fourth aspect of the invention, there is provided a fingertip tracking computer system including a processor, memory, a display, a 3D or depth sensing image camera system, and a computer program executable by the processor, the computer system receiving a stream of 3D or depth sensing image camera system data from the 3D or depth sensing image camera system, the computer program executable by the processor to identify fingertips in the 3D or depth sensing image camera system data, and to track fingertips in the 3D or depth sensing image camera system data, in which
(i) the processor receives image data from the camera system;
(ii) the processor runs a first kernel comprising a set of concentric closed shapes over image data to identify an occupancy pattern in which internal closed shapes are at least nearly fully occupied, and in which a subsequent closed shape has at least a relatively low occupancy level, so as to identify one or more fingertips in the image data;
(iii) for each identified fingertip, the processor runs a second kernel over the identified one or more fingertips to establish a best fit closed shape which covers each identified fingertip;
(iv) the processor calculates a centroid for each best fit closed shape which corresponds to an identified fingertip;
(v) the processor stores in the memory the calculated centroids for the identified one or more fingertips, and
(vi) the processor tracks the fingertips using the stored calculated centroids of the fingertips.

The fingertip tracking computer system may be one wherein the display is a desktop display, a laptop display, a tablet display, a mobile phone display, a smartwatch display, a smart TV display, a stereoscopic display, a holographic display, a wearable display or a HUD display.

The fingertip tracking computer system may be one wherein the computer system includes a desktop computer, a laptop computer, a tablet computer, a mobile phone computer, a smartwatch computer, a smart TV computer, a stereoscopic display computer, a holographic display computer, a wearable display computer or a HUD display computer.

The fingertip tracking computer system may be one wherein the tracked fingertips are displayed in the display.

The fingertip tracking computer system may be one wherein display data is sent to the display by wired connection.

The fingertip tracking computer system may be one wherein display data is sent to the display wirelessly.

The fingertip tracking computer system may be one wherein the fingertip tracking computer system is a fixed system.

The fingertip tracking computer system may be one wherein the fingertip tracking computer system is a mobile system.

The fingertip tracking computer system may be one arranged to perform a method of any aspect of the first aspect of the invention.

BRIEF DESCRIPTION OF THE FIGURES

Aspects of the invention will now be described, by way of example(s), with reference to the following Figures, in which.

DETAILED DESCRIPTION

Ghost Hands

Figure 1:
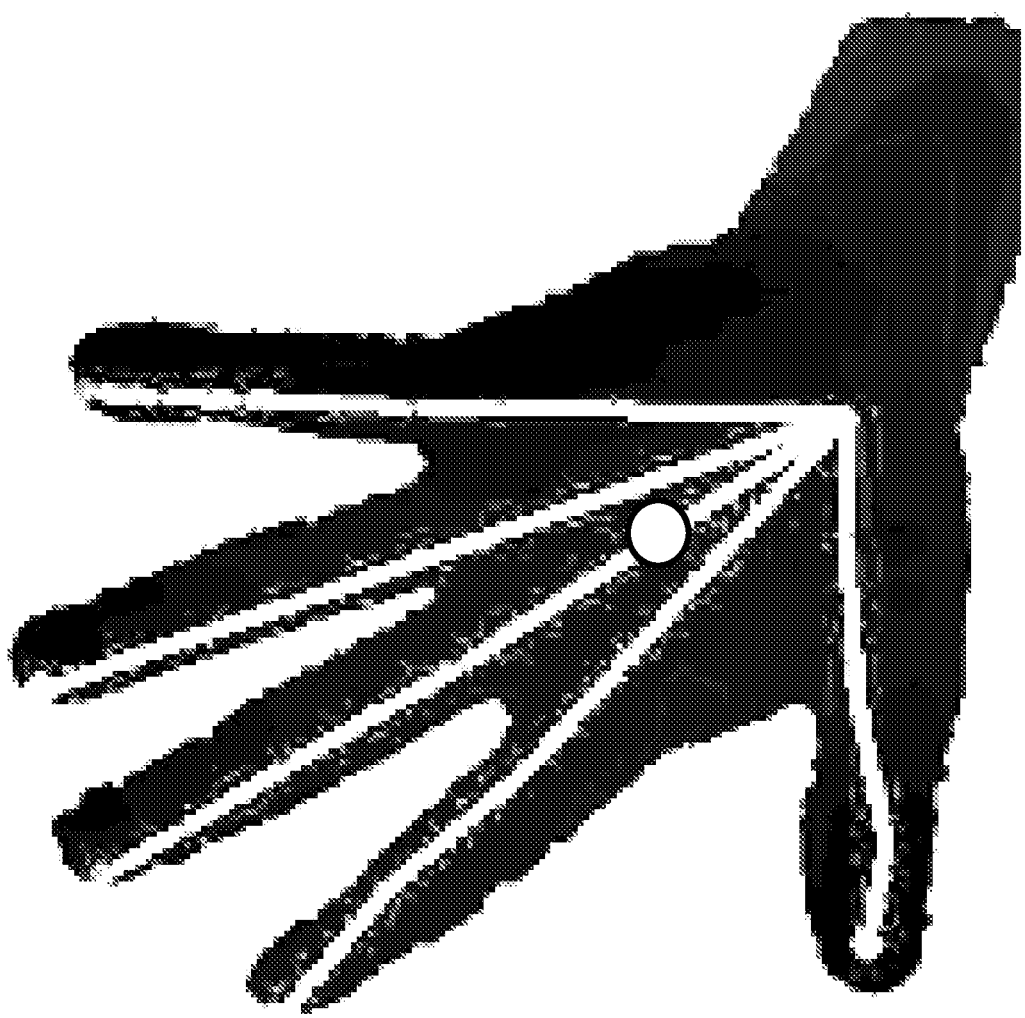
FIG. 1 shows an example in which the four detected fingertips are located off-centre of the ends of the fingers. The large white circle identifies the detected hand centre.
Figure 2:
FIG. 2 shows an example of a poor result in attempted finger tracking, in which two hands are only partially in view when approaching the bottom of the screen. The large white circles identify the detected hand centres.
Figure 3:
FIG. 3 shows an example of a poor result in attempted finger tracking, in which one hand is only partially in view. The large white circle identifies the detected hand centre.
Figure 4:
FIG. 4 shows an example of a poor result in attempted finger tracking, in which the fingers of the hand have been closed into a fist. The large white circle identifies the detected hand centre.
Figure 5:
FIG. 5 shows an example of a poor result in attempted finger tracking, in which the fingers of the hand have been closed into a fist. The large white circle identifies the detected hand centre.

'Ghost hands' is a user interface paradigm for using 2D and 3D user interfaces with fingertips. The fingertips are scanned or detected using a 3D or depth sensing camera system such as an Intel Real Sense or Microsoft Kinect. A 3D or depth sensing camera system typically includes a conventional camera, an infrared laser projector, an infrared camera, and a microphone array. The infrared projector projects a grid onto the scene (in infrared light which is invisible to human eyes) and the infrared camera records it to compute depth information. A stereoscopic camera system is another example of a 3D or depth sensing camera system.

The Ghost Hands solution is applicable, for example, to desktop, Augmented Reality, Virtual Reality and Tabletop Mixed Reality scenarios. For example, where the 3D or depth sensing camera is mounted in the bezel of a laptop or tablet—where a 3D or depth sensing camera is mounted onto a wearable device, such as a stereoscopic headset facing outward—and also where an image projector is calibrated to the same field of view as the 3D camera allowing the users hands to interact with projected images.

In an example of a mixed reality application for this technology, a projector is aligned with the same physical space as the camera, with respect to a tabletop (i.e. the camera and the projector are pointing down towards the table top). Then images are projected onto the table, and users hands or other objects in the view are detected by the system in 3D and the image and projection angles may be adjusted as a result.

Solution Aspects
Overview

There is provided a machine vision fingertip tracking capability. There is provided a gesture library which can detect taps, wiggles, swipes and dwells. There is provided a user interface (UI) library for visualising the user's hands and fingertips and their state. In the tracking, sub pixel accuracy, per frame accuracy with no lag, and very natural feedback for users, may be provided.

Detailed Example

1) Overlay (e.g. a partially transparent overlay or a transparent overlay) may be provided in a display of a view of the raw depth data which has been thresholded on the users view (e.g. on a screen or in a stereo corrected view per eye).
2) The thresholding should allow for a normal range of hand motion near the camera, but the intensity with which the hand is rendered may fall off visually as a hand gets too far away from the intended position, so that users can be guided back into the correct distance for their hand from the camera.
3) A cursor (e.g. crosshairs) should be presented to the user on each of the detected digit tips e.g. at a smooth 60 fps.
4) These fingertip cursors can now be used for interaction with 2D or 3D user interface elements; the fingertip cursors may have icon and/or colour indications of their state.
5) For stereo views the flattened hand visualisation should converge at about the exact same depth as the head up display (HUD) displayed interface elements so there is no ambiguity on picking the interface elements. In a full 3D UI the z buffer can be used to suitably distort the view for one or both of the eye views depending on how the z buffer view has been generated (e.g. structured light or stereopsis based techniques will have one eye already correct; time of flight will require distorting each view by half of the ocular distance).
    a. Because virtual reality (VR) currently has a fixed projection/display distance, close range focus cannot be used as a cue: close range stereo is not ideal for the human visual system to align hands with objects in a 3d world. A compromise would be to show the fingertip cursors converging on the UI HUD plane while the hand/fingers retain their stereo nature.
    b. The benefit of keeping the fingertip cursors and UI converged is that for the user, the usability will be much better and more natural.
6) Virtual Reality use cases, just like desktop use cases, will often have hands reaching up into the view with potentially only the fingertips visible—making the approach described here ideal.

Fingertip Gestures Examples
1) Simplicity and repeatability are critical for user interface interactions. With the algorithm-based approach described in this document, and a 640×480 z buffer, it is possible to accurately pick one of 26 items horizontally on the screen such as keys on a piano keyboard, at a repeatability of over 98%.
2) A clear user mental model and immediate feedback from the UI is required for discoverability and usability. On-screen hands make it easy for users to understand how their hand and the user interface interact. The ability to have the interactive fingertips low on the view makes it easy to access the whole user interface.
3) Hover, dwell, tap and point metaphors may all be supported.
4) Swipes (eg. of a finger or fingers) over an active area are also passed to the underlying object.
5) Dwell (eg. of a finger or fingers) to lock/select and then drag. Shake or move out of view to release (e.g. show a tether line while locked/selected).
6) Tilt finger to drag or paint.
7) Gravity well—the hover cursor will snap to the nearest UI element as if there is a gravity effect—e.g. the closer to the UI, the more tightly it snaps. This gives the user additional support in picking UI elements where they are required to tap or tilt the finger which may move the cursor. Note this effect is disabled when in other modes such as dragging or painting.

5 or 4 Digit Gestures Examples
1) Use an open hand to rotate, e.g. based on detection of four or five digits in a high five pose. When tested for a change in rotation, if a change in rotation of the hand is detected, this will rotate the locked/selected item around the z axis.
2) Panning left, right, up and down with four fingers in a row may act as an x, y scrolling/rotating gesture for the locked/selected item. This interaction may also be utilised with as few as two fingers in a row.
3) Push and pull into the screen may act as a modifier gesture on the locked/selected item (for example, two common modifiers would be rotating around the x axis or scaling in overall size).

Halo Fingertip Detection

A traditional fingertip detector using contour tracking is good at detecting fingertips, but has some computational challenges, or shortcomings, around finding the centre of the fingertip.

In contrast the halo approach described here is kernel based, hence it may be used in parallel with other processes, and may be optimised to take advantage of a graphics processing unit (GPU) or specialised image processing hardware (e.g. an FPGA or an ASIC). A core motivation is to generate extremely accurate and stable centroids for the fingertips.

In image processing, a kernel, convolution matrix, or mask is a matrix useful for e.g. blurring, sharpening, embossing, edge detection, and for other functions. This may be accomplished by convolution between a kernel and an image.

Figure 6:
FIG. 6 shows an example in which depth data has been thresholded so that the hands are the only likely objects in the view.
Figure 7:
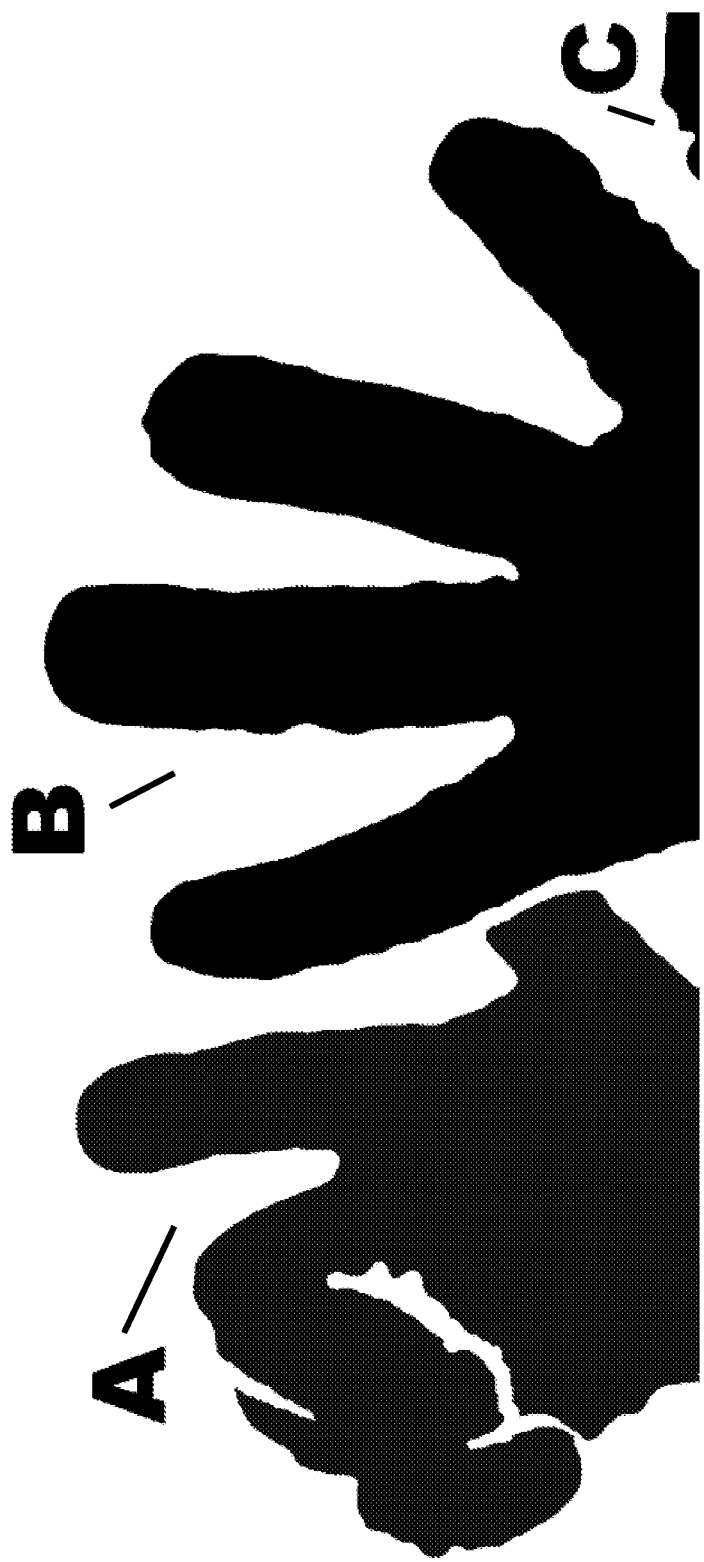
FIG. 7 shows an example in which an identifying fill has been run, which has resulted in identifying hand A, hand B and object C.
Figure 8:
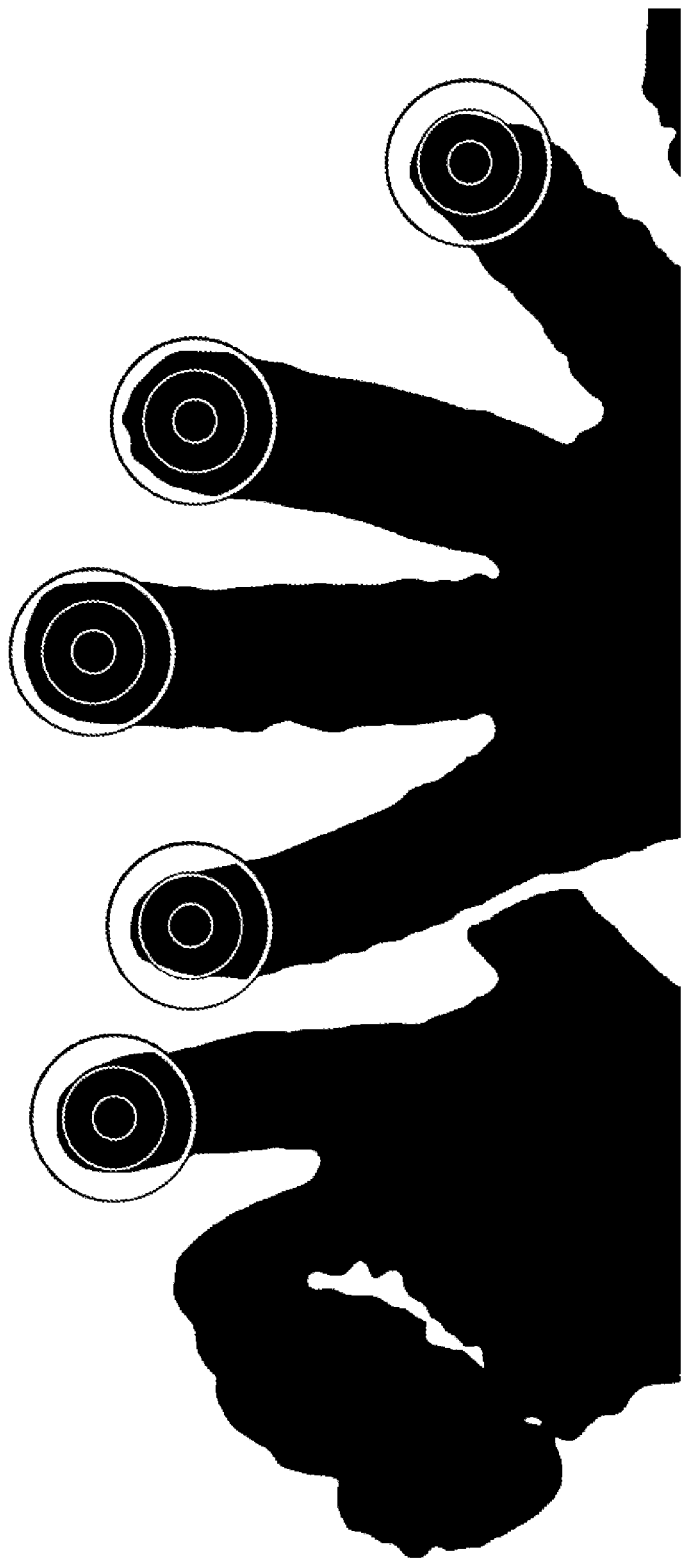
FIG. 8 shows an example in which a fingertip of the hand on the left has been identified, and in which four fingertips of the hand on the right have been identified.

In an example of fingertip detection:
1) Threshold the depth data so the hands are the only likely objects in the view. An example in which depth data has been thresholded so that the hands are the only likely objects in the view is shown in FIG. 6.
2) Run a modified morphological operator to erode edges based on curvature (e.g. using the z value differences we can estimate the normal vector—hence detect the edges of the fingers and ensure that even fingers held tightly side by side will be separated).
3) Run a modified morphological operator to infill holes and average the z values.
4) Run an identifying (eg. a colouring) fill over the remaining items (e.g. blobs) so overlapping hands, or other objects, can be separated and identified. An example is shown in FIG. 7, in which an identifying fill which has been run on the data of FIG. 6, after it has been subjected to steps 2 and 3, has resulted in identifying hand A, hand B and object C.
5) Run a sparse kernel comprising a series of concentric rings. This is used as a fast first pass to identify the best fingertip candidates at a range of scales (as the finger will appear larger in the camera view the closer it is to the camera). These rings are looking for an occupancy pattern where the internal rings are fully (or nearly fully) occupied, and then a subsequent ring has a halo with very few values, or with relatively few values (i.e. with very few occupied pixels, or with relatively few occupied pixels). For example, checking only the item (eg. blob) identifier (eg. colour) from the central rings—e.g. treat other items (e.g. blobs) as non-occupied pixels (e.g because they have different colours). An example is shown in FIG. 8, in which a fingertip of the hand on the left has been identified, and in which four fingertips of the hand on the right have been identified. For the fingertip of the hand on the left, the inner two circles are fully occupied, whereas the outer circle has relatively few occupied pixels. For the fingertips of the hand on the right, the inner two circles are fully occupied, or nearly fully occupied, whereas the outer circles have relatively few occupied pixels.

6) From the list of best matches, a full kernel is run over the fingertip to establish the best fit circle which covers the tip of the finger. The pixels inside the circle are averaged for x, y and z values. For example, at a midrange from the camera with a 640×480 buffer, a fingertip is roughly 60×80=4800 pixels in size. This generates a centroid which is accurate to a $5^{th}$ of a pixel on a 640×480 buffer with strong spatial coherency between frames, as the rings keep a constant fit at the tip despite noise in the finger silhouette.

Figure 9:
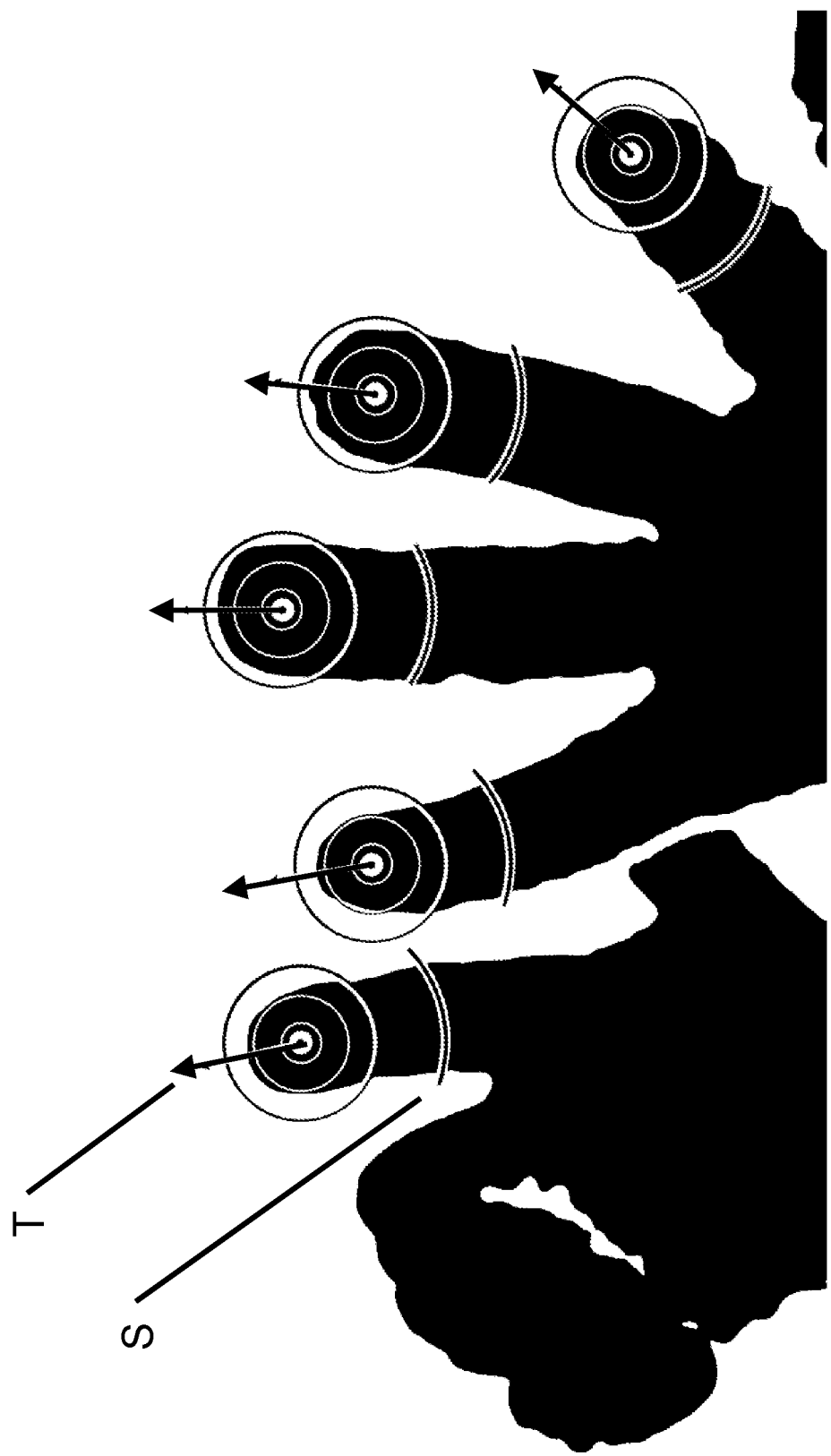
FIG. 9 shows an example in which the respective pointing angles in two dimensional space of the fingers are determined.

7) The occupancy of an outer ring (e.g. at two times the radius of the fit of the fingertip) is used to determine the angle in two dimensional space of the finger (e.g. a compass angle). An example is shown in FIG. 9, in which for the detected fingertip of the hand on the left, an outer ring segment S at two times the radius of fit of the finger tip has been drawn over the finger, and an arrow T has been drawn which points along the derived direction of the finger, away from the palm of the hand. In FIG. 9, the same procedure has been followed for the four detected fingertips of the hand on the right. The z sample from the boundary is used to determine the z gradient of the fingertip (e.g. from finger to tip) to determine if it is facing into, flat or out of the view.

8) Some detected 'fingers' can be rejected if the radius and the z distance are outside the scale expected from human child/adult fingertips.

9) Temporal tracking with a simple motion predictor is used to identify fingertips between frames to ensure a consistent identification (ID) number is passed back to the underlying software—ID numbers are recycled when a finger is not detected for at least 2 frames—this feeds into the gesture processing system.

In an example, for scrolling or panning, we don't require users to hold up their whole hand—but in fact just two fingers is enough to go into scrolling mode or into panning mode, or into a scrolling and panning mode.

Piano with Overlay

Figure 10:
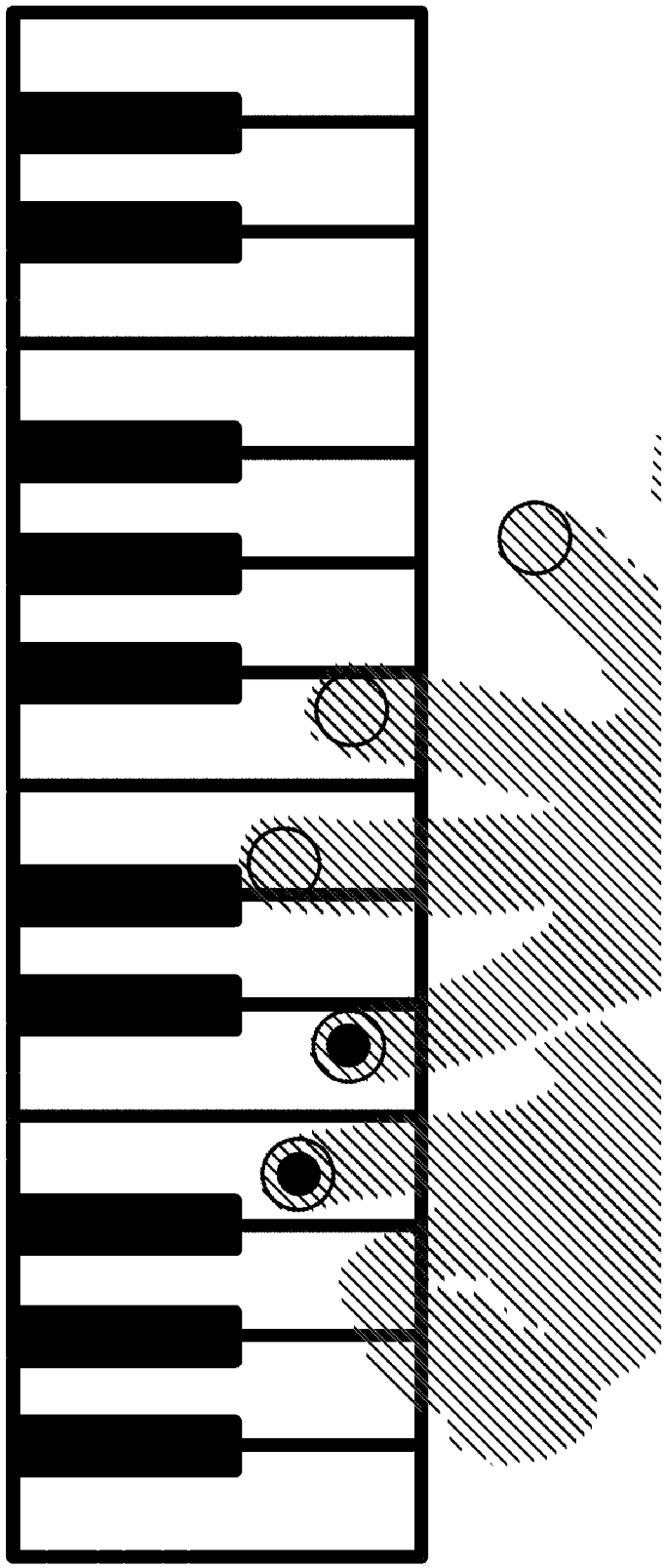
FIG. 10 shows an example in which the fingertips on the white keys four and five places from the left are highlighted because they are activating these keys, while the three rightmost detected fingertips are not activating a piano key, and hence are not highlighted.

Fingers tilted forward (i.e. tilt detected), or currently being moved toward the screen in the z axis (i.e. tapping motion detected), may be displayed with a (e.g. red) highlight indicating they are activating the piano key they are directly above. An example is shown in FIG. 10, in which the fingertips on the white keys four and five places from the left are highlighted because they are activating these keys, while the three rightmost detected fingertips are not activating a piano key, and hence are not highlighted.

Stereo Views for Augmented and Virtual Reality

Figure 11:
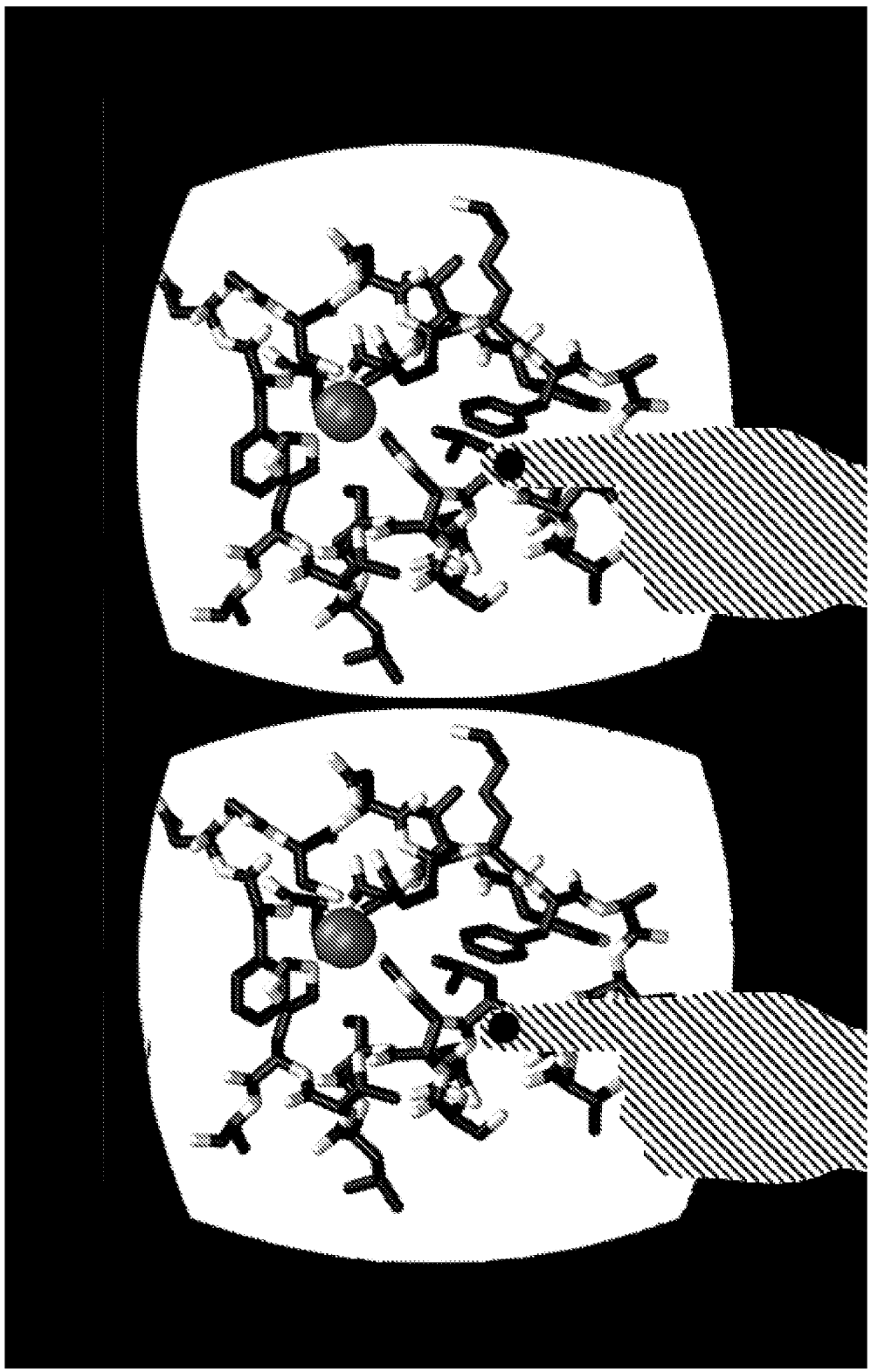
FIG. 11 shows an example in which for each of a left stereoscopic view and a right stereoscopic view, the fingertip is detected even though about half the hand is outside the tracked environment.

By tracking fingertips, the same camera used to scan the world (for augmented reality scenarios) can be used. A user does not need to have their hand completely in view. With the ghost hands approach fingertips show up clearly while traditional skeletal tracking faces ambiguous skeletal poses of the back of the hand. An example is shown in FIG. 11, in which for each of a left stereoscopic view and a right stereoscopic view, the fingertip is detected even though about half the hand is outside the tracked environment.

Example Hardware Systems and Implementations

Figure 12:
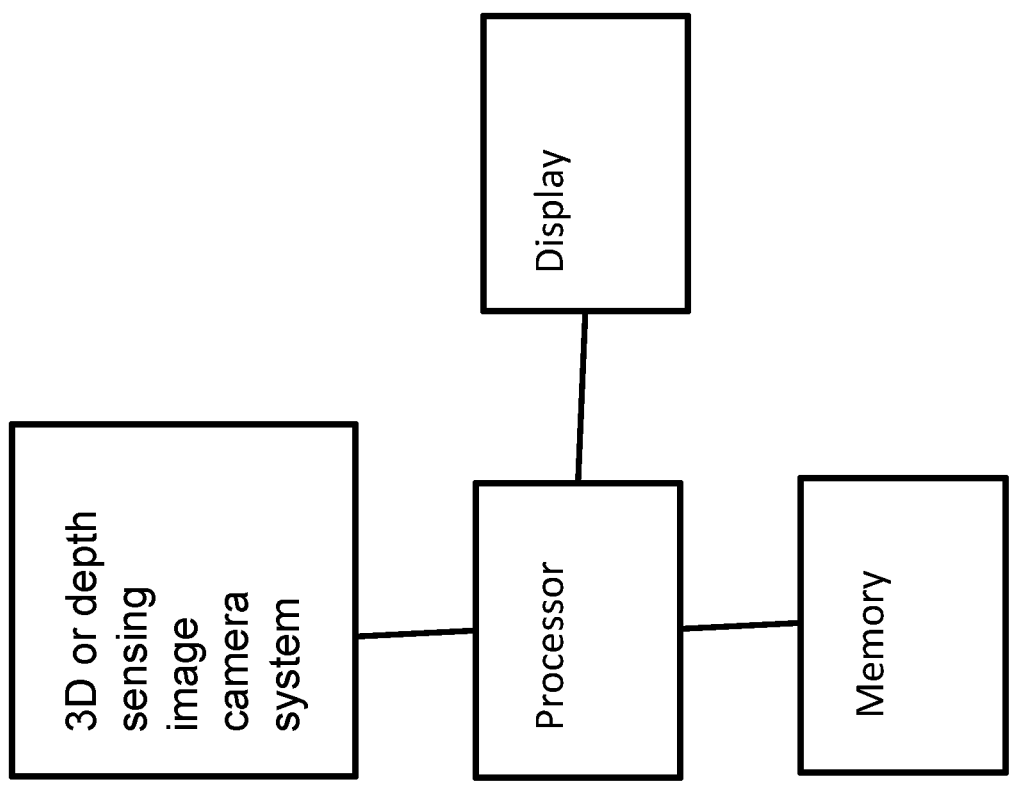
FIG. 12 shows an example of a fingertip tracking computer system comprising a processor, memory, a display and a 3D or depth sensing image camera system.

An example finger tracking hardware system comprises a computer system including a processor, memory, a display, a 3D or depth sensing image camera system, and a computer program executable by the processor, the computer system receiving a stream of 3D or depth sensing image camera system data from the 3D or depth sensing image camera system, the computer program executable by the processor to identify fingertips in the 3D or depth sensing image camera system data, and to track fingertips in the 3D or depth sensing image camera system data. The tracked fingertips may be displayed in the display. Display data may be sent to the display by wired connection, or wirelessly. The display may be, for example, a desktop display, a laptop display, a tablet display, a mobile phone display, a smartwatch display, a smart TV display, a stereoscopic display, a holographic display, a wearable display or a HUD display. The finger tracking hardware system may be a fixed or a mobile finger tracking hardware system. An example finger tracking hardware system is shown in FIG. 12. The processor may also generate user interface elements, for display in the display together with the tracked fingertips. The processor may detect selection of a displayed user interface element, when a tracked fingertip position satisfies a predefined spatial relationship with respect to a displayed user interface element. Fingertip tracking data may be stored (e.g. in memory) for further analysis, such as for analysis in order to identify gestures. The processor may analyse stored fingertip tracking data and identify an execution of a fingertip gesture by a fingertip.

Halo Fingertip Pseudo Code Example

```
Function process_fingertips_per_frame( )
{
buffer = Read_z_data( )
z_buffer = pack_texture(buffer)
gpu_buffer = transfer_to_GPU(z_buffer)
threshold(gpu_buffer, maximum_z_distance)
z_erode(gpu_buffer, z_delta_erode_ratio)
z_fill_smooth(gpu_buffer, kernel_size, amount)
color_blob_id(gpu_buffer, minimum_blob_pixels)
candidate_list = sparse_halo(gpu_buffer)
loop (candidate_list)
{
vector3_position_list,         vector3_angle_list         =
```

```
        fit_halo(candidate_list_entry)
    {
    }
}
Function sparse_halo(gpu_buffer)
{
            foreach_pixel(gpu_buffer)
            {
                center_pixel = pixels(center_vector)
                foreach_ring( )
                {
                    z_occupancy[ring] = pixels(sample_vectors)
                }
                if   z_occupancy[inner_rings]    ==    high    &&
                     z_occupancy[outer_rings] == low
                {
                    candidate_list += center_vector
                }
            }
            return candidate_list
}
Function fit_halo(vector candidate_list_entry)
{
foreach_pixel_in_search_space(gpu_buffer)
            {
foreach_ring( )
                {
                    z_occupancy[ring] = pixels (full_circle)
                }
                if   z_occupancy[inner_rings]        ==    high    &&
                     z_occupancy[outer_rings]        ==    low     &&
                     ring_scale > min && ring_scale < max
                {
                    vector3_position_list += precise_center_vector
vector3_angle_list += angle_vector
                }
            }
    return vector3_position_list, vector3_angle_list
}
```

NOTE

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A computer implemented method of fingertip centroid identification in real-time, implemented on a computer system comprising a processor, memory, and a camera system, the method including the steps of:
   (i) the processor receiving image data from the camera system, in which the camera system is a 3D or depth sensing image camera system;
   (ii) the processor running a first kernel comprising a set of concentric closed shapes over image data to identify an occupancy pattern in which internal closed shapes satisfy a high occupancy level condition, and in which a subsequent closed shape satisfies a low occupancy level condition, so as to identify one or more fingertips in the image data;
   (iii) for each identified fingertip, the processor running a second kernel over the identified one or more fingertips to establish a best fit closed shape of each identified fingertip, which covers each identified fingertip;
   (iv) the processor calculating a centroid for each best fit closed shape which corresponds to an identified fingertip, and for each identified fingertip, sampling a finger boundary in z axis to obtain a z sample from the finger boundary, wherein the z sample from the finger boundary is used to determine a gradient of the fingertip in the z axis, to determine if the finger is facing into, flat or out of the view; and
   (v) the processor storing in the memory the calculated centroids for the identified one or more fingertips, and storing in the memory for each finger the respective determination of if the respective finger is facing into, flat or out of the view.

2. The method of claim 1, in which sub pixel accuracy, and per frame accuracy with no lag, are provided.

3. The method of claim 1, in which the 3D or depth sensing image camera system is an infrared-based depth sensor system or a stereoscopic camera system.

4. The method of claim 3, in which the infrared-based depth sensor system is an Intel Real Sense or a Microsoft Kinect.

5. The method of claim 1, wherein depth data is thresholded so that hands are the only likely objects in the view.

6. The method of claim 1, the processor running a modified morphological operator to erode edges based on depth and/or curvature.

7. The method of claim 1, the processor running a modified morphological operator to infill holes and average z values.

8. The method of claim 1, the processor performing an identifying fill on spatially proximate pixels in image data, so as to identify possible hands or hand parts in the image data.

9. The method of claim 1, the processor identifying fingers and determining respective angles in two dimensional space of the identified fingers.

10. The method of claim 1, (i) in which the camera system provides a stream of image data; or (ii) in which the camera system provides a stream of image data, and the processor calculating a stream of centroids from the stream of image data, the processor tracking the identified one or more fingertips by analyzing a stream of calculated centroids for the identified one or more fingertips; or (iii) in which the camera system provides a stream of image data, wherein temporal tracking with a simple motion predictor is used to identify fingertips between frames; or (iv) in which the camera system provides a stream of image data, and wherein the processor uses the tracked identified one or more fingertips to identify a gesture by the one or more fingertips; or (v) in which the camera system provides a stream of image data, and wherein the processor uses the tracked identified one or more fingertips to identify a gesture by the one or more fingertips, wherein the gesture is a tap, wiggle, swipe, hover, point, shake, tilt finger or dwell.

11. The method of claim 1, in which the camera system provides a stream of image data, the processor calculating a stream of centroids from the stream of image data, the processor tracking the identified one or more fingertips by analyzing a stream of calculated centroids for the identified one or more fingertips, and storing fingertip tracking data, wherein the processor analyses the stored fingertip tracking data and identifies an execution of a recognized fingertip gesture by a fingertip.

12. The method of claim 1, wherein the computer system further comprises a display.

13. The method of claim 12, (i) wherein on the display, an overlay is provided of depth data which has been thresholded on the users view; or (ii) wherein the intensity with which a hand is rendered on the display falls off visually as a hand gets too far away from the intended position; or (iii) wherein a cursor is presented on the display for each of the identified fingertips; or (iv) wherein a cursor is presented on the display for each of the identified fingertips, and wherein a fingertip cursor has an icon and/or colour indication of its state.

14. The method of claim 12, wherein the processor displays user interface elements on the display.

15. The method of claim 14, (i) wherein the processor identifies fingertip gestures for interaction with the user interface elements; or (ii) wherein the processor detects selection of a displayed user interface element, when a tracked fingertip position satisfies a predefined spatial relationship with respect to a displayed user interface element; or (iii) in which fingers tilted forward (i.e. tilt detected), or currently being moved toward the screen in the z axis (i.e. tapping motion detected), are used in a piano playing application; or (iv) in which the display is a HUD display, in which for stereo views the flattened hand visualisation converges at about the exact same depth as the head up display (HUD) displayed interface elements.

16. The method of claim 1, in which the processor is a graphics processing unit (GPU) or specialised image processing hardware (e.g. an FPGA or an ASIC).

17. A computer program product for fingertip centroid identification in real-time, the computer program product executable embodied on a non-transitory storage medium and on a processor of a computer system comprising the processor, memory, and a camera system, to:
  (i) receive image data from the camera system, in which the camera system is a 3D or depth sensing image camera system;
  (ii) execute a first kernel comprising a set of concentric closed shapes over image data to identify an occupancy pattern in which internal closed shapes satisfy a high occupancy level condition, and in which a subsequent closed shape satisfies a low occupancy level condition, so as to identify one or more fingertips in the image data;
  (iii) for each identified fingertip, execute a second kernel over the identified one or more fingertips to establish a best fit closed shape of each identified fingertip, which covers each identified fingertip;
  (iv) calculate a centroid for each best fit closed shape which corresponds to an identified fingertip, and for each identified fingertip, sample a finger boundary in z axis to obtain a z sample from the finger boundary, wherein the z sample from the finger boundary is used to determine a gradient of the fingertip in the z axis, to determine if the finger is facing into, flat or out of the view; and
  (v) store in the memory the calculated centroids for the identified one or more fingertips, and store in the memory for each finger the respective determination of if the respective finger is facing into, flat or out of the view.

18. A fingertip tracking computer system including a processor, memory, a display, a 3D or depth sensing image camera system, and a computer program embodied on a non-transitory storage medium and executable by the processor, the computer system receiving a stream of 3D or depth sensing image camera system data from the 3D or depth sensing image camera system, the computer program executable by the processor to identify fingertips in the 3D or depth sensing image camera system data, and to track fingertips in the 3D or depth sensing image camera system data, in which
  (i) the processor receives image data from the camera system;
  (ii) the processor runs a first kernel comprising a set of concentric closed shapes over image data to identify an occupancy pattern in which internal closed shapes satisfy a high occupancy level condition, and in which a subsequent closed shape satisfies a low occupancy level condition, so as to identify one or more fingertips in the image data;
  (iii) for each identified fingertip, the processor runs a second kernel over the identified one or more fingertips to establish a best fit closed shape of each identified fingertip, which covers each identified fingertip;
  (iv) the processor calculates a centroid for each best fit closed shape which corresponds to an identified fingertip, and for each identified fingertip, samples a finger boundary in z axis to obtain a z sample from the finger boundary, wherein the z sample from the finger boundary is used to determine a gradient of the fingertip in the z axis, to determine if the finger is facing into, flat or out of the view;
  (v) the processor stores in the memory the calculated centroids for the identified one or more fingertips, and stores in the memory for each finger the respective determination of if the respective finger is facing into, flat or out of the view; and (vi) the processor tracks the fingertips using the stored calculated centroids of the fingertips.

19. The fingertip tracking computer system of claim 18, wherein the display is a desktop display, a laptop display, a tablet display, a mobile phone display, a smartwatch display, a smart TV display, a stereoscopic display, a holographic display, a wearable display or a HUD display.

20. The fingertip tracking computer system of claim 18, wherein the computer system includes a desktop computer, a laptop computer, a tablet computer, a mobile phone computer, a smartwatch computer, a smart TV computer, a stereoscopic display computer, a holographic display computer, a wearable display computer or a HUD display computer.

21. The fingertip tracking computer system of claim 18, wherein the tracked fingertips are displayed in the display.

22. The fingertip tracking computer system of claim 21, wherein display data is sent to the display by wired connection, or wherein display data is sent to the display wirelessly.

23. The fingertip tracking computer system of claim 18, wherein the fingertip tracking computer system is a mobile system.

24. A fingertip tracking computer system including a processor, memory, a display, a camera system, in which the camera system is a 3D or depth sensing image camera system, and a computer program embodied on a non-transitory storage medium and executable by the processor, the computer system receiving a stream of camera system image data from the camera system, the computer program executable by the processor to identify fingertips in the camera system image data, in which (i) the processor receives image data from the camera system;

(ii) the processor runs a first kernel comprising a set of concentric closed shapes over image data to identify an occupancy pattern in which internal closed shapes satisfy a high occupancy level condition, and in which a subsequent closed shape satisfies a low occupancy level condition, so as to identify one or more fingertips in the image data;

(iii) for each identified fingertip, the processor runs a second kernel over the identified one or more fingertips to establish a best fit closed shape of each identified fingertip, which covers each identified fingertip;

(iv) the processor calculates a centroid for each best fit closed shape which corresponds to an identified fingertip, and for each identified fingertip, samples a finger boundary in z axis to obtain a z sample from the finger boundary, wherein the z sample from the finger boundary is used to determine a gradient of the fingertip in the z axis, to determine if the finger is facing into, flat or out of the view; and (v) the processor stores in the memory the calculated centroids for the identified one or more fingertips, and stores in the memory for each finger the respective determination of if the respective finger is facing into, flat or out of the view.

* * * * *